US009397732B2

(12) United States Patent
Talnishnikh et al.

(10) Patent No.: US 9,397,732 B2
(45) Date of Patent: Jul. 19, 2016

(54) MOTES FOR ENVIRONMENT MAPPING (71) Applicant: Stichting INCAS3, Assen (NL)

(72) Inventors: Elena Talnishnikh, Amersfoort (NL); Hendrik Albert Duisterwinkel, Groningen (NL); Heinrich Johannes Wörtche, Bedum (NL); Johannes Hubertus Gerardus Van Pol, Groningen (NL)

(73) Assignee: STICHTING INCAS3, Assen (NL)

( * ) Notice: Subject to any disclaimer, the term of this patent is extended or adjusted under 35 U.S.C. 154(b) by 85 days.

(21) Appl. No.: 14/553,780

(22) Filed: Nov. 25, 2014

(65) Prior Publication Data
US 2015/0155920 A1   Jun. 4, 2015

(30) Foreign Application Priority Data
Dec. 4, 2013   (NL) .................................. 2011892

(51) Int. Cl.
*H04M 7/00*   (2006.01)
*H04B 7/04*   (2006.01)
(Continued)

(52) U.S. Cl.
CPC *H04B 7/04* (2013.01); *H04L 27/10* (2013.01); *H04L 67/12* (2013.01); *H04W 84/18* (2013.01)

(58) Field of Classification Search
CPC ............ H04M 2250/12; H04M 11/00; H04M 3/42348; H04M 1/72533; H04W 4/008
USPC ...................... 455/500, 517, 41.1, 41.2, 41.3, 455/456.1–457, 403, 422.1, 426.1, 426.2, 455/414.1–414.4, 550.1, 454, 514, 412.1, 455/67.11; 340/539.11, 539.13, 539.1, 340/539.22
See application file for complete search history.

(56) References Cited

U.S. PATENT DOCUMENTS

| 2004/0008113 | A1  | 1/2004 | Pradhan et al. |
| 2007/0210929 | A1* | 9/2007 | Sabata ................... G01V 11/00 340/686.5 |
| 2012/0170412 | A1* | 7/2012 | Calhoun ............... G01S 3/8083 367/118 |

FOREIGN PATENT DOCUMENTS

| GB | 2487435 A | 7/2012 |
| KR | 20080050981 A | 6/2008 |
| WO | 2006/110713 A2 | 10/2006 |

OTHER PUBLICATIONS

Dubbelman, G., Duisterwinkel, E., Demi, L., Talnishnikh, E., Wortche, H.J. & Bergmans, J.W.M. (2014). Robust sensor cloud localization from range measurements. Conference Paper : Proceedings of the IEEE/RSJ International Conference on Intelligent Robots and Systems (IROS), Sep. 14-18, 2014, Chicago, Illinois, (pp. 3820-3827). Piscataway: IEEE Service Center.
(Continued)

*Primary Examiner* — Keith Ferguson
(74) *Attorney, Agent, or Firm* — Kenealy Vaidya LLP (57) ABSTRACT

Some embodiments provide a first mote and a system of motes for detecting a spatially configuration without the need for an external reference. A first mote is configured for wirelessly receiving a plurality of signal pulses transmitted by a plurality of second motes, each second mote transmitting the signal pulse at one particular modulation frequency from a plurality of frequencies of a frequency band. The first mote includes a receiver for determining from a received signal at least one of the plurality of signal pulses and for identifying the particular modulation frequency of the at least one signal pulse. The first mote further includes a clock for generating a time-stamp at which the signal pulse is received and a storage unit for storing the time-stamp and the corresponding identified particular modulation frequency. The system includes a plurality of first motes and second motes.

16 Claims, 5 Drawing Sheets

(51) Int. Cl.
*H04L 27/10* (2006.01)
*H04L 29/08* (2006.01)
*H04W 84/18* (2009.01)

(56) References Cited

OTHER PUBLICATIONS

Duisterwinkel, E., Demi, L., Dubbelman, G., Talnishnikh, E., Wörtche, H.J. & Bergmans, J.W.M. (2014). Environment mapping and localization with an uncontrolled swarm of ultrasound sensor motes. Conference Paper : Proceedings of the 166th Meeting of the Acoustical Society of America, Dec. 2-6, 2013, San Fransisco, California, (Proceedings of Meetings on Acoustics, 20, pp. 4pEA7-1/6). Acoustical Society of America.

Search Report and Written Opinion of the Dutch patent application No. NL2011892 dated Aug. 14, 2014.

\* cited by examiner

| Mote 1 = F4 | | |
|---|---|---|
| Time [ms] | Frequency | Parameter |
| T=0 | | |
| 0,2 | F1 | x,x |
| 0,5 | F4 | x,x |
| 0,7 | F6 | x,x |
| 1,2 | F9 | x,x |
| 1,6 | F2 | x,x |
| 2 | F4 | x,x |
| 2,3 | F3 | x,x |
| 2,4 | F8 | x,x |
| 3,2 | F3 | x,x |
| 3,3 | F2 | x,x |
| 3,9 | F5 | x,x |
| 4,5 | F7 | x,x |
| 4,8 | F3 | x,x |
| 5,3 | F1 | x,x |
| T=1 | | |
| 0,2 | F1 | x,x |
| 0,4 | F4 | x,x |
| 0,7 | F6 | x,x |
| 1,1 | F9 | x,x |
| 1,5 | F2 | x,x |
| 1,9 | F4 | x,x |
| 2,5 | F8 | x,x |
| 2,6 | F3 | x,x |
| 3,3 | F3 | x,x |
| 3,5 | F2 | x,x |
| 4,1 | F5 | x,x |
| 4,4 | F7 | x,x |
| 4,9 | F3 | x,x |
| 5,3 | F1 | x,x |

Fig. 5A

| Mote 2 = F2 | | |
|---|---|---|
| Time [ms] | Frequency | Parameter |
| T=0 | | |
| 0,1 | F3 | x,x |
| 0,8 | F2 | x,x |
| 1,1 | F6 | x,x |
| 1,6 | F4 | x,x |
| 2,4 | F9 | x,x |
| 2,9 | F8 | x,x |
| 3,2 | F2 | x,x |
| 3,3 | F1 | x,x |
| 3,5 | F5 | x,x |
| 3,6 | F6 | x,x |
| 4 | F5 | x,x |
| 4,6 | F3 | x,x |
| 5 | F7 | x,x |
| 5,5 | F2 | x,x |
| T=1 | | |
| 0,1 | F3 | x,x |
| 0,7 | F2 | x,x |
| 1 | F6 | x,x |
| 1,5 | F4 | x,x |
| 2,5 | F9 | x,x |
| 2,8 | F8 | x,x |
| 3,3 | F1 | x,x |
| 3,4 | F2 | x,x |
| 3,5 | F5 | x,x |
| 3,7 | F6 | x,x |
| 4,1 | F5 | x,x |
| 4,5 | F3 | x,x |
| 4,9 | F7 | x,x |
| 5,6 | F2 | x,x |

Fig. 5B

| Mote 3 = F7 | | |
|---|---|---|
| Time [ms] | Frequency | Parameter |
| T=0 | | |
| 0,2 | F6 | x,x |
| 0,7 | F4 | x,x |
| 0,9 | F8 | x,x |
| 1,1 | F1 | x,x |
| 1,6 | F7 | x,x |
| 1,7 | F5 | x,x |
| 2 | F2 | x,x |
| 2,3 | F8 | x,x |
| 2,4 | F3 | x,x |
| 2,6 | F2 | x,x |
| 3,2 | F9 | x,x |
| 4,5 | F4 | x,x |
| 4,5 | F6 | x,x |
| 5 | F2 | x,x |
| T=1 | | |
| 0,2 | F6 | x,x |
| 0,7 | F4 | x,x |
| 0,9 | F8 | x,x |
| 1,1 | F1 | x,x |
| 1,6 | F7 | x,x |
| 1,7 | F5 | x,x |
| 2 | F2 | x,x |
| 2,3 | F8 | x,x |
| 2,4 | F3 | x,x |
| 2,6 | F2 | x,x |
| 3,2 | F9 | x,x |
| 4,4 | F4 | x,x |
| 4,5 | F6 | x,x |
| 4,9 | F2 | x,x |

Fig. 5C

MOTES FOR ENVIRONMENT MAPPING

FIELD

Some embodiments relate to a first mote for mapping an unknown environment, as well as to a mapping system.

BACKGROUND ART

A mote is a node in a wireless network and often refers back to a relatively small sensor with energy storage. They have been used in many diverse applications, from earthquake measurements to warfare.

Such related art motes typically include a controller, transceiver, power source and one or more sensors. One example of environmental monitoring can be found in the NASA sensor web. This network includes spatially distributed sensors that wirelessly communicate with each other. In this network, every mote sends out collected data to every other mote, so substantially every mote knows what is happening in the network.

The position of the individual motes should typically be known when using such related art networks for environmental mapping. This is typically done using GPS systems to provide information on each one of the individual motes in the network. However, in some remote environments, such as, for example, oil wells or sewer systems in cities, the GPS signal does not reach the individual motes and other means of mapping the environment have to be found.

SUMMARY

Some embodiments therefore provide a mote and a system of motes which is capable of detecting a spatial configuration of an environment without external reference.

A first aspect of the invention provides a first mote for wireless receiving a plurality of signal pulses. A second aspect of the invention provides a mapping system including a plurality of first motes.

A method in accordance with the first aspect of the invention includes a first mote for wirelessly receiving a plurality of signal pulses transmitted by a plurality of second motes in which each second mote (210, 220, 230, 240, 300) transmits the signal pulse being a carrier wave modulated with an envelope function at one particular modulation frequency from a plurality of frequencies within a predefined frequency band. The first mote includes a receiver configured and constructed for receiving signals within the predefined frequency band and for determining from the received signals at least one of the plurality of signal pulses. The receiver is further configured and constructed to identify the particular modulation frequency of the at least one signal pulse. The first mote includes a clock for generating a time-stamp at which the signal pulse is received by the first mote. The first mote further includes a storage unit for storing the time-stamp together with the corresponding identified particular modulation frequency.

The inventors have realized that the identification of individual motes in a system of motes may be possible by the frequency at which the individual motes emit their signal pulses. When mapping an unknown environment, for example, because it is difficult to access and/or where state of art remote controlled exploration technologies cannot be used. The localization of motes relative to each other may be used for mapping such environment. In the current description, a distinction is made between first motes which include a receiver and second motes which emit signal pulses at signal pulses at one of the frequencies in a predefined frequency band. Still, this invention also covers the situation in which all first motes and all second motes both transmit a signal pulse at a specific frequency within the predefined frequency band, and also receive the signal pulses from neighboring motes at a frequency within the predefined frequency band. By storing both the time delay between the emission of the signal pulse by the second mote (for example, a neighboring mote) at a specific frequency and the receiving of that same signal pulse by the first mote, a distance between the first mote and second mote can be determined. When also storing the frequency at which the received signal pulse was transmitted, the neighboring second mote can be identified compared to other neighboring second motes. The frequency may, for example, may be stored via a frequency label identifying the frequency within the predefined band of frequencies. From this data for a plurality of second motes, it is possible to determine which second motes surround the first mote and at which distance. Gathering this data over time also allows to determine a temporal change in the distribution of the second motes around the first mote. Combining this data for a plurality of first motes allows for determining the spatial configuration of the environment in which the system of first motes and second motes is located without external reference. Thus, localizing motes relative to each other within the environment allows for determining a geometrical structure or map of the environment.

In a preferred embodiment, all second motes emit the signal pulse at a unique frequency within the predefined frequency band, but this often is impractical due to the vast amount of motes required for detecting the spatially configuration of an environment. Still, selecting a limited number of frequencies within the predefined frequency band also allows for identifying most of the immediate neighboring second motes of each first mote—which is sufficient for determining a spatial configuration of the environment. For example, at least two motes of the plurality of second motes are configured for a different modulation frequency.

In an embodiment of the first mote, the predefined frequency band is divided in a plurality of non-overlapping frequency sub-bands, the receiver being configured and constructed to identify the particular modulation frequency of the at least one signal pulse in any of the plurality of non-overlapping frequency sub-bands. Using such plurality of non-overlapping frequency sub-band may be used to identify individual motes in a system of motes. For example, the receiver may be configured to receive signal pulses having a modulation frequency from any of the plurality of frequencies.

In an embodiment of the first mote, the first mote further includes a transmitter for transmitting a first signal pulse, the first mote being configured and constructed for transmitting the first signal pulse being a carrier wave modulated with an envelope function at a first particular modulation frequency being one of the plurality of frequencies within the predefined frequency band. In this configuration, the first mote also transmits a signal pulse within the predefined frequency band which signal may be received by a further first mote located in the neighborhood. This allows that the relative position of the first motes relative to each other may also be determined, which simplifies the overall determination of the spatial configuration and mapping of the environment.

In an embodiment of the first mote, the transmitter by design is configured and constructed to only transmit signal pulses at the first particular modulation frequency together with a further time-stamp at which the first signal pulse is transmitted. For example, the transmitter may be hardware limited to only transmit the signal pulse at the first particular modulation frequency. This may be a solution in which the overall required hardware components are reduced or minimal and so the dimensions of the first mote may be reduced or minimized and/or the cost of the first mote may be reduced or minimized. Alternatively, the transmitter may be limited to only transmit the signal pulse at the first particular modulation frequency via a software design. As such, each of the first motes may be identical and may have a predefined first frequency at which the signal pulse is transmitted which is defined in the software loaded in the controller or in the transmitter. In addition, the transmitter may provide information on the time-stamp at which the signal pulse is transmitted. This may be achieved by further data in the first signal pulse, or due to the synchronization of the first mote relative to the neighboring motes.

In an embodiment of the first mote, the first mote is configured and constructed for transmitting a sequence of first signal pulses, each first signal pulse being transmitted at the first particular modulation frequency at predetermined time intervals between the subsequent first signal pulses. Using such a sequence of signal pulses allows for monitoring not only the spatial distribution of the motes, but also the change of this spatial distribution over time. This is especially beneficial when the motes are used for mapping an environment in which the motes migrate through the environment, such as a sewer system or an oil well. Determining the change of the distribution of motes over time enables identification of the overall dimensions of the environment while the motes migrate through this environment.

In an embodiment of the first mote, the first mote includes a device for extracting data from the storage unit. Such device may, for example, include a wireless device in which the first mote starts to wirelessly emit the date stored in the storage unit after receiving, for example, a trigger signal. Motes are often relatively small, which makes the attachment of other data extraction devices, such as wires or rather elaborate cables. Using a wireless extraction of data would thus be preferred. However, in some cases, the power of the motes may be been drained empty after having been inside the environment for a considerable amount of time. In such a situation, the motes may not be able to transmit the data from the storage unit and so partial re-charging or using a wired connection may be the way to access the data collected. Even further alternatively, the storage unit may simply be removed from the mote and connected to a data-extraction system for directly extracting the data from the storage unit.

In an embodiment of the first mote, the predefined frequency band (F1-Fn) includes ultrasound and/or electro-magnetic radiation. Typically, the required frequency band depends on the property of the fluid in which the motes have to communicate with each other and the required distances between the motes. In oil or water, ultrasound may be used, while in vacuum, electro-magnetic radiation would be required. The frequency range of ultrasound in air can be from several Hertz (long range) up to several 100's kilohertz (short range). In water the range can be extended to several megahertz. Using electromagnetic radiation the range can be from megahertz up to gigahertz range.

In an embodiment of the first mote, the first mote is configured and constructed to synchronize the clock upon receiving of a synchronization signal. Such a synchronization signal may be provided to the first mote and to other first motes in the system before the first motes are inserted into the environment. Preferably, also the second motes may be synchronized before being inserted into the environment. Using synchronized clocks for each of the first motes and second motes simplifies the distance determination significantly.

In an embodiment of the first mote, the first mote is configured and constructed to be buoyant in a predefined fluid. As indicated before, the first mote may migrate through the environment. This may be achieved when the first mote is configured to be buoyant in the predefine fluid. This predefined fluid may, for example, be crude oil, water or even a gaseous substance. Of course, also the second motes preferably have similar buoyant characteristics such that they can migrate through the environment to be mapped.

In an embodiment of the first mote, at least some of the signal pulses include data representing additional information measured by at least some of the first motes and the second motes. Some of the first motes and second motes may, for example, include a sensor for sensing additional information from the environment, for example, temperature, pressure, vibrations, etcetera. Using this additional information may enhance the mapping of the environment in that not only position information is gathered by the motes, but also a temperature distribution, pressure distribution, or any other distribution of measured data.

The first motes and second motes may all have one or more sensors for collecting this additional data. Alternatively, some of the first motes and second motes may be divided into sets of motes each set of motes having a specific sensor. This limits the additional electronics necessary in the motes for the sensing, while this additional information still is measured at a significant number of positions inside the environment to map the additional information to the spatial configuration.

The system in accordance with the second aspect of the invention includes a plurality of first motes according to any of the previous embodiments and a plurality of second motes being configured for transmitting the signal pulse, each second mote transmitting the signal pulse at one particular modulation frequency within a predefined frequency band. As indicated before, the use of a plurality of first motes and second motes in the system enables to determine a spatial configuration of the environment in which the motes are located without external reference. This is especially beneficial in remote and closed environments, such as oil wells, water distribution systems, ice covered rivers, lakes or sewer system.

In an embodiment of the system, the clock of each of the plurality of first motes is synchronized. This may, for example, be achieved by activating a fraction of motes to emit a specific sequence of signal pulses in order to trigger the neighboring motes to emit signal pulses at the same sequence. Alternatively, a synchronization signal or a sequence of synchronization signals may be transmitted to all the motes in the system to synchronize the motes in the system.

In an embodiment of the system, the second motes are identical to the first motes. Separating the sensing of the signal pulses and the transmitting of the signal pulses amongst the first motes and the second motes, respectively, allows for the individual first motes and second motes to contain as few electrical components as possible. This enhances miniaturization or enables a maximum miniaturization of the motes and allows for the motes to consume as little power as possible, thus expanding the operational use of the motes to a maximum. Still, when all motes both transmit and receive the signal pulse, they all contribute to the overall mapping of the environment, which significantly simplifies the overall system and the overall reconstruction of the spatial configuration of the environment. This is achieved when the first motes and the second motes are identical.

In an embodiment of the system, the first motes and the second motes in the system are configured for storing the time-stamp together with the corresponding identified particular modulation frequency during a predetermined time for detecting a spatial configuration of an environment.

In an embodiment of the system, the system is configured for detecting the spatial configuration of the environment without a reference outside the system.

BRIEF DESCRIPTION OF THE DRAWINGS

These and other aspects of the invention are apparent from and will be elucidated with reference to the embodiments described hereinafter. In the drawings.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

Figure 1:
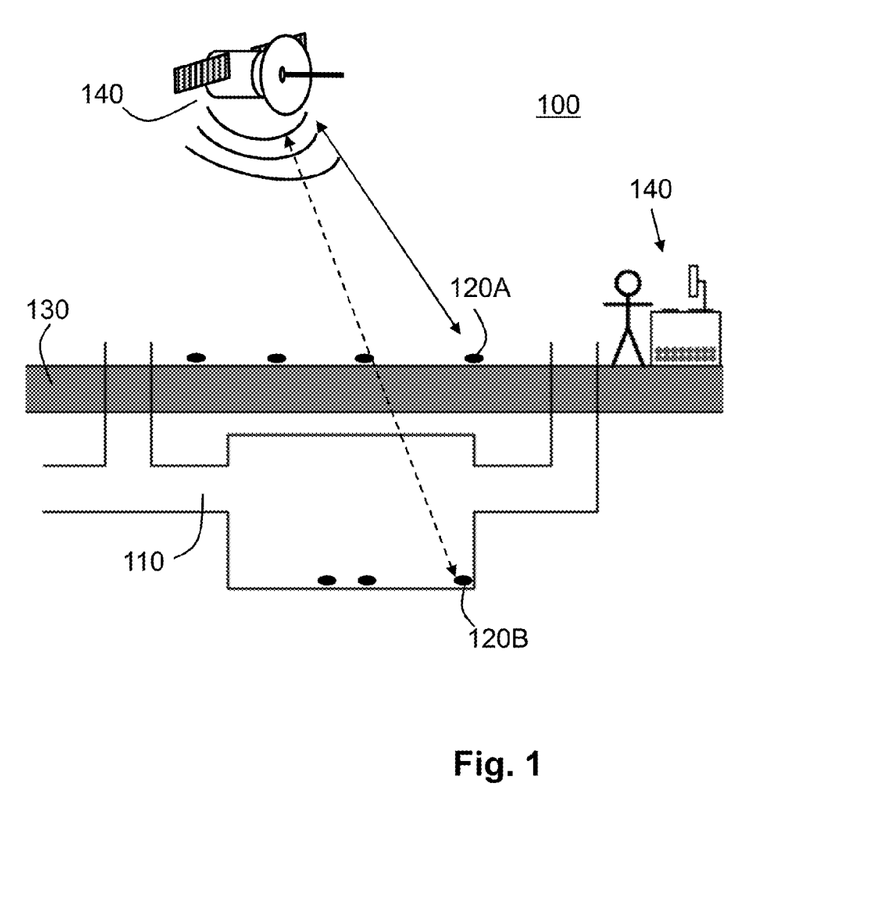
FIG. 1 shows a system in which a mapping is required using motes.

FIG. 1 shows an environment 100 in which a mapping is required. As indicated before, in known systems, the mapping of an environment may be done using a plurality of known sensor 120, also indicated as known motes 120A. The known motes 120A are distributed in the environment and communicate, for example, with a satellite 140 (indicated with a double arrow) to determine their position. This communication may also be used to exchange additional information which may be collected by the known motes 120A, such as local temperature, pressure, vibrations, etc. This information may be transferred to the base station 140—for example, again using the satellite 140 to collect all information and to interpret the received data to extract the required mapping. Alternatively, the network of known motes 120A may exchange the individual information of each of the known motes 120A amongst the other known motes 120A, such that each of the other known motes 120A substantially contains all or a specific sub-set of the information collected in the system of motes 120.

However, in some situations, which are subject to this patent, when motes 120B are distributed in a inaccessible (by regular means) location 110, for example, at a location below the earth surface 130, such as an oil well 110, the communication between motes 120B and the satellite 140 fails or is not possible (indicated with the dashed double arrow). As such, the position information of the individual known motes 120B cannot be collected and the mapping fails.

Figure 2:
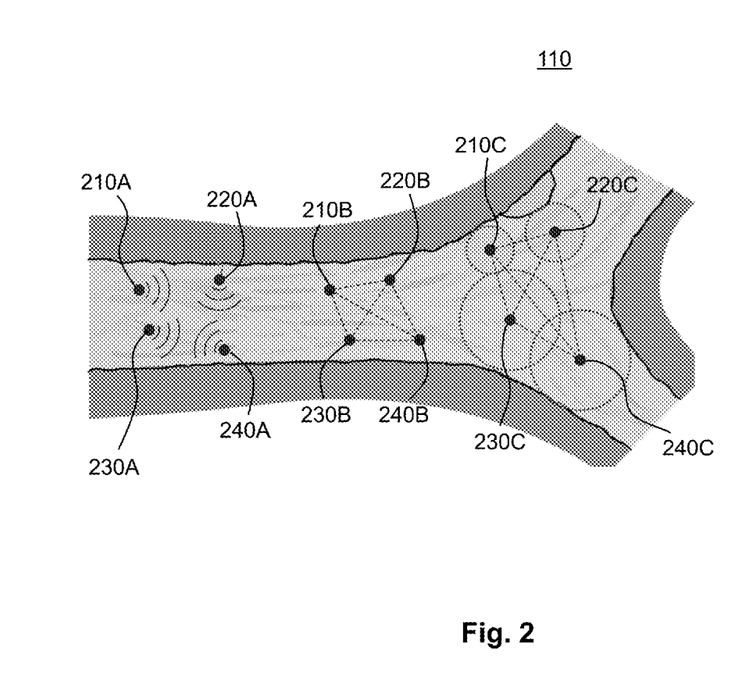
FIG. 2 shows a plurality of motes according to the invention moving through the environment, being a part of an oil well.

FIG. 2 shows a plurality of motes 210, 220, 230, 240 according to the invention moving through an environment 110, being a part of an oil reservoir 110. The individual motes 210, 220, 230, 240 move through the environment 110 and send out signal pulses, for example, acoustic signal pulses, at one particular modulation frequency F1, . . . Fn within a range of frequencies F1, . . . Fn. The signal pulse is a carrier wave modulated with an envelope function at one particular modulation frequency (F1, F2, . . . Fn). Each of the motes 210, 220, 230, 240 according to the invention is configured to receive signal pulses from the neighboring motes 210, 220, 230, 240 and is configured to determine a time-stamp t at which the signal pulses are received. Each of the motes 210, 220, 230, 240 is further capable of identifying the particular modulation frequency F1 . . . Fn at which the signal pulse is received and links this identified particular modulation frequency F1 . . . Fn to the time-stamp T. The motes 210, 220, 230, 240 store this information (see FIG. 5) in a storage unit 330 (see FIG. 3) within the mote 210, 220, 230, 240. Knowing the characteristics of the fluid in which the motes 210, 220, 230, 240 are located, the distance between the neighboring motes 210, 220, 230, 240 and the receiving mote 210, 220, 230, 240 can be determined using the time delay between the time at which the signal pulse is emitted from the neighboring mote 210, 220, 230, 240 to the time at which the signal pulse is received by the receiving mote 210, 220, 230, 240. As indicated before, the individual neighboring motes 210, 220, 230, 240 are identified by their respective frequencies F1, . . . Fn at which they emit their signal pulse. Because the motes 210, 220, 230, 240 determines a distance to their neighboring motes 210, 220, 230, 240 which have been identified by the frequency F1 . . . Fn at which the neighboring motes 210, 220, 230, 240 emit their signal, the overall relative position of the motes 210, 220, 230, 240 relative to the receiving mote 210, 220, 230, 240 can be determined. Using the relative positioning of a plurality of motes 210, 220, 230, 240 and their neighboring motes 210, 220, 230, 240, the complete environment 110 can be mapped without external communication.

Such remote mapping is typically done in environments 110 with fluid flow, such as sewer systems and oil reservoirs 110, because this enables the motes 210, 220, 230, 240 to be inserted at one point of the system 110 and to be recovered at another point of the system 110. When the plurality of motes 210, 220, 230, 240 are moving through the environment 110 from a location A via a location B to a location C (indicated by adding a letter A, B and C to the individual reference numbers of the plurality of motes 210, 220, 230, 240), the measured time delay between the emitted signal pulses of the neighboring motes 210, 220, 230, 240 changes and thus the change in relative position of the individual motes 210, 220, 230, 240 can be calculated. Because, preferably, each of the motes transmits their signal pulses at one specific frequency F1 . . . Fn in the range of frequencies F1 . . . Fn, the individual motes 210, 220, 230, 240 can be identified. However, in view of the vast number of motes 210, 220, 230, 240 necessary to map such an environment 110 and the vast range of frequencies required to assign a specific frequency to a specific motes, clusters of motes 210, 220, 230, 240 emit their signal pulses at the same frequency F1 . . . Fn within the range of frequencies F1 . . . Fn. In a system in which clusters of motes 210, 220, 230, 240 emit the same frequencies, still the neighboring motes 210, 220, 230, 240 can be identified as will be shown in relation with FIG. 5.

When the motes 210, 220, 230, 240 are recovered at a later stage, the time delay information connected to a specific frequency F1 . . . Fn information enables to identify neighboring motes 210, 220, 230, 240 and the relative position of these neighboring motes 210, 220, 230, 240 relative to the receiving mote 210, 220, 230, 240. Due to the fact that substantially all motes 210, 220, 230, 240 receive signal pulses from neighboring motes 210, 220, 230, 240, most information regarding the positioning of the motes 210, 220, 230, 240 relative to each other is stored in substantially in each of the motes 210, 220, 230, 240. As such, it is not necessary that all motes 210, 220, 230, 240 are recovered to generate a mapping of the environment 110.

In an alternative embodiment, some of the motes 210, 220, 230, 240 in the system only receive the signal pulses from neighboring motes 210, 220, 230, 240 and some of the motes 210, 220, 230, 240 only transmit signal pulses. Although this is a less preferred configuration, such system may have a benefit that less power is consumed by the individual motes 210, 220, 230, 240 and as such the overall operation time of the system of motes 210, 220, 230, 240 may be extended.

Figure 3:
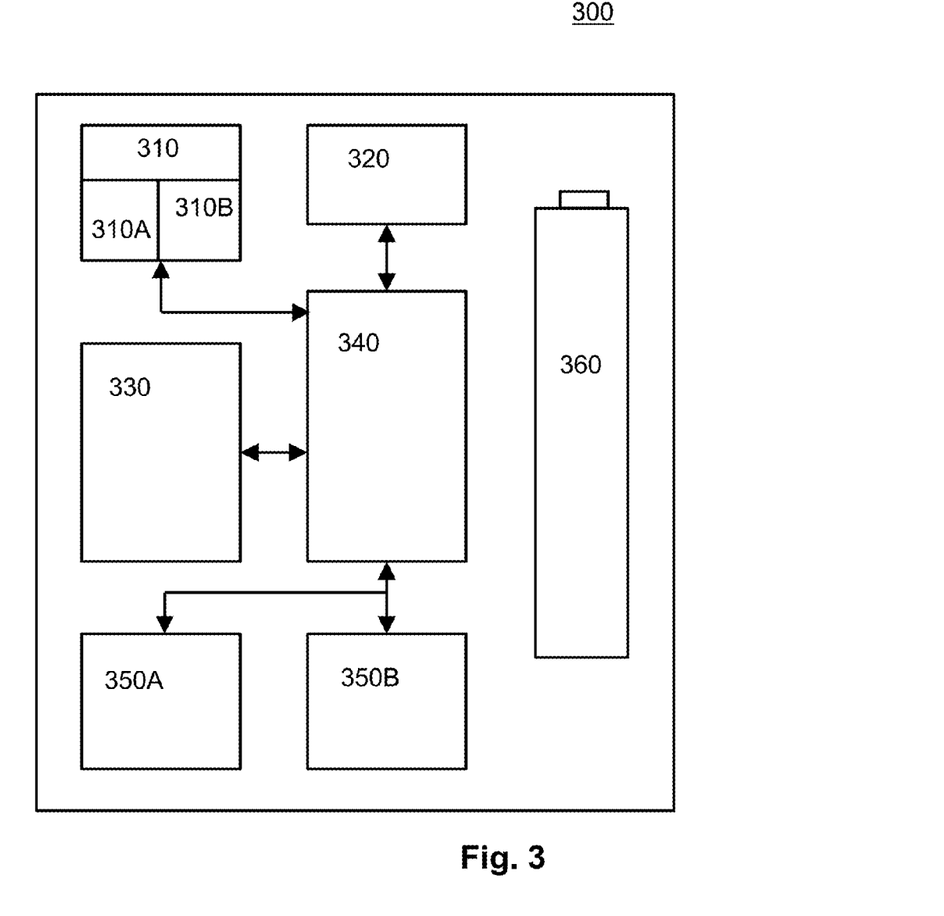
FIG. 3 shows a schematic view of a mote according to the invention.

FIG. 3 shows a schematic view of a mote 300 according to the invention. The mote 300 includes a transceiver 310, a clock 320 and a processor 340 connected to the transceiver 310 and the clock 320 for identifying the time stamp at which a signal pulse is received. The transceiver 310 typically includes a receiver 310A and a transmitter 310B. Furthermore, the receiver 310A is configured to identify the frequency F1 . . . Fn within the range of frequencies F1 . . . Fn at which the signal pulse is received and provides this information to the processor 340. The processor 340 combines the time stamp information together with the frequency information of the received signal pulse and stores this information in the storage unit 330 also connected to the processor 340. This stored information may be read out at a later stage to recover the plurality of frequency F1 . . . Fn and time stamp information to determine a relative distance between the neighboring motes 210, 220, 230, 240 and the receiving mote 300. Optionally, the mote 300 may include additional sensor units 350A, 350B which are also connected to the processor 340 to provide the processor with further sensed information. The sensor units 350A, 350B may, for example, include pressure sensors 350A, temperature sensors 350B, vibration sensors, pH sensor, magnetic field sensors. The mote 300 as schematically shown in FIG. 3 also includes a power unit 360 such as a energy storage 360 to ensure that the mote 300 can operate during a predetermined time.

In an embodiment of the mote 300, the transceiver 310 also transmits a signal pulse at a predefined frequency F1 . . . Fn within the range of frequencies F1 . . . Fn. In such an embodiment, the mote 300 not only receives information from the neighboring motes 210, 220, 230, 240, but contributes to the network by transmitting a signal pulse in the predefined frequency F1 . . . Fn. Neighboring motes 210, 220, 230, 240 may identify the mote 300 by its predefined frequency F1 . . . Fn. In a further embodiment, the received signal pulse contains additional information, for example, information sensed by the sensor units 350A, 350B which is stored together with the time stamp and the frequency F1 . . . Fn at which the signal pulse is received. This would enable a mapping of the environment 110 in different dimensions, such as a mapping of the temperature distribution, of the pressure distribution, etc.

In an embodiment of the mote 300, the mote 300 includes a read-out device (not indicated in FIG. 3) via which the data stored in the storage unit 330 may be read out. This read-out device may, for example, be a wireless read-out device, which may emit the stored information upon receiving a trigger. Alternatively, the read-out device may be a wired read-out device.

In an embodiment of the mote 300, the mote 300 includes a synchronization device (not indicated in FIG. 3) for synchronizing the clock of the plurality of motes 210, 220, 230, 240, 300. Using synchronized clocks in each of the motes 210, 220, 230, 240, 300 used for mapping the specific environment 110 allows for an easier determination of the time delay between the sending of a signal pulse by a neighboring mote 210, 220, 230, 240 and the receiving of the signal pulse by the mote 300. This synchronizing may be performed by a specific synchronization signal send to all motes 210, 220, 230, 240, 300 simultaneously which will be used in the system. This specific synchronization signal may, for example, be provided wirelessly, for example, at one of the frequencies F1 . . . Fn of the predetermined range of frequencies F1 . . . Fn.

The system according to the invention includes the plurality of motes 210, 220, 230, 240, 300 which may, for example, be inserted into an oil well 110 via a bore into the oil reservoir 110. Next, the motes 210, 220, 230, 240, 300 will migrate through the oil reservoir 110 for some time. Finally, a part of the motes 210, 220, 230, 240, 300 inserted into the oil well 110 may be recovered by filtering the harvested oil from the well. During this process, the motes 210, 220, 230, 240, 300 may need to pass oil pumps to get inserted into and harvested from the oil well 110 and so these motes 210, 220, 230, 240, 300 should be well protected for these harsh environments. While in the oil well 110, the motes 210, 220, 230, 240, 300 may, for example, have buoyant properties, such that they can float through the oil well 110 from the insertion point to the harvesting point. These buoyant properties may relate to a container 400, 410 (see FIGS. 4A and 4B) in which the motes 210, 220, 230, 240, 300 may be inserted. This container 400, 410 may also be used to protect the motes 210, 220, 230, 240, 300 against the harsh environment of the crude oil in the oil well 110 and against possible mechanical contact with moving parts in the pumps. When the motes 210, 220, 230, 240, 300 in their container 400, 410 may be used in a different environment, the containers 400, 410 may need to be replaced to ensure buoyant properties in that different environment.

In an embodiment of the motes 210, 220, 230, 240, 300, the frequency range F1 . . . Fn is defined by size of the mote and the environment and the characteristics of the fluid through which the signals have to be transmitted. The frequency range F1 . . . Fn may include ultrasound and/or electromagnetic radiation. The frequency range in air can be from several Hertz (long range) up to several 100's kilohertz (short range). In water the range may be extended to several megaHertz. Using electromagnetic radiation the range may be with megahertz or even gigaHertz in air.

Figure 4A:
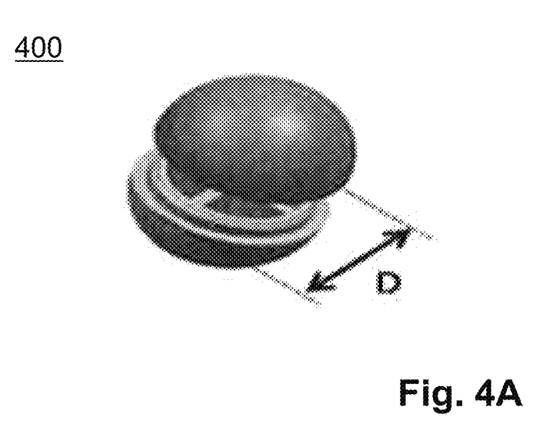
FIGS. 4A and 4B show possible containers for the motes according to the invention.
Figure 4B:
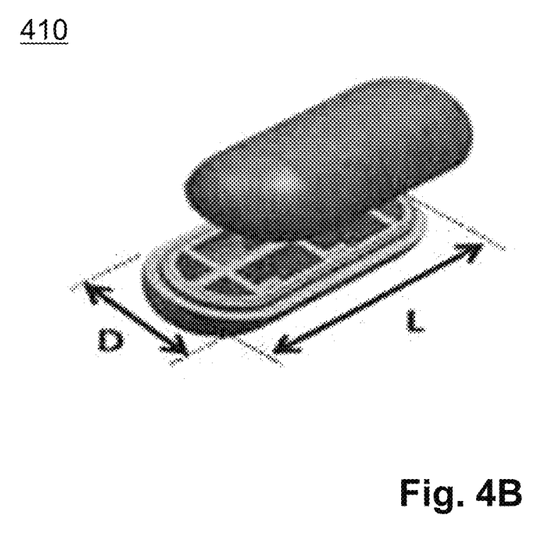
Figure 5A:
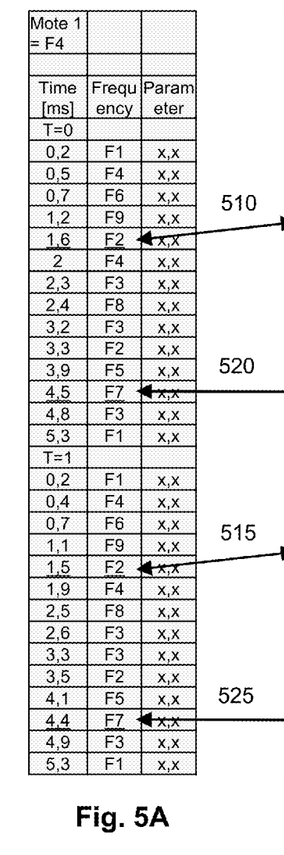
FIGS. 5A, 5B and 5C show possible data contents in the storage unit of individual motes in a system.
Figures 5B, 5C:
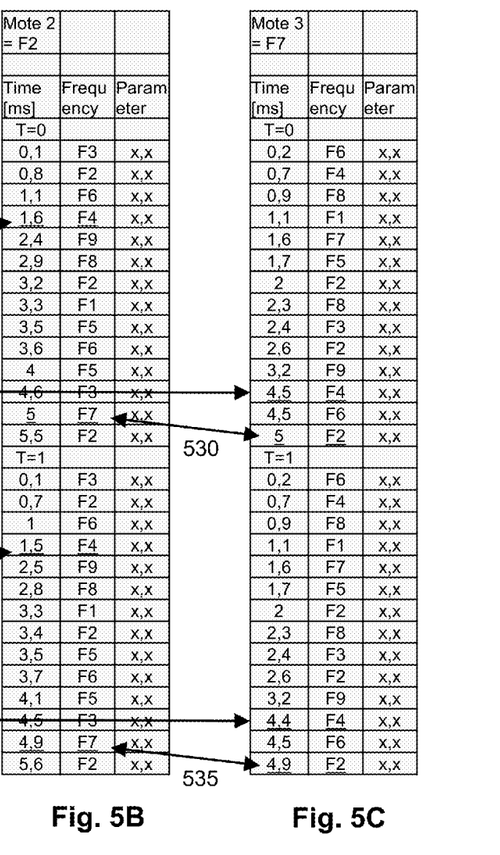

In an embodiment of the motes 210, 220, 230, 240, 300, the identification of the identification of the received signal pulses is done by looking at the frequency band in which the signal pulse has been received/emitted. These frequency bands are said to be orthogonal since they don't overlap (say up to 99% of their energy) in the frequency domain FIGS. 4A and 4B show possible containers 400, 410 for the motes 210, 220, 230, 240 300 according to the invention. As indicated above, the motes 210, 220, 230, 240 300 according to the invention may be used in harsh environments 110 and so may require a specific container 400, 410 for protecting the motes 210, 220, 230, 240 300 while migrating through the harsh environment 110. Furthermore, the containers 400, 410 may protect the motes from mechanical impact of moving parts when they have to pass pumps used, for example, to harvest crude oil from the oil well 110. Finally, the containers 400, 410 may be used to ensure that the motes 210, 220, 230, 240, 300 may float through the environment 110 which has to be mapped. FIGS. 5A, 5B and 5C show possible data content of the storage unit 330 in individual motes 210, 220, 230, 240, 300 in the system. FIG. 5A shows an example of a data listing collected by a first mote MOTE1. At T=0, the first signal pulse is emitted by the first mote MOTE1 at a predefined frequency indicated as F4 and by all neighboring motes MOTE2, MOTE3 at their respective frequencies F2, F7. At T=1, the second signal pulse is emitted by the first mote MOTE1 at the predefined frequency F4 and by all neighboring motes MOTE2, MOTE3 at their respective frequencies F2, F7. The first column in the data listing shown in FIG. 5A indicates the measured time delay from T=0 and T=1, respectively, in milliseconds at which signal pulses from neighboring motes MOTE2, MOTE3 are received by the first mote MOTE1. The second column in the data listing includes a frequency identifier which indicates the frequency F1 . . . Fn of the signal pulse received at the respective time delay. The third column in the data listing indicates possible further data that may be stored and that may, for example, be extracted from the signal pulse received from the neighboring motes MOTE2, MOTE3. FIG. 5B shows an example of the data listing collected by a second mote MOTE2, which also includes the time delay in the first column, the frequency identifier, and the third column again includes possible additional data, for example extracted from the received signals. FIG. 5C shows a similar data listing collected by the third mote MOTE3.

From these data listings, the neighboring motes MOTE1, MOTE2, MOTE3 may be identified as is indicated by the double arrows in FIGS. 5A, 5B and 5C. The arrow indicated with reference number 510 shows that the time delay measured by the first mote MOTE1 for the frequency F2 of the second mote MOTE2 is substantially identical to the time delay (time delay is 1.6 millisecond) measured by the second mote MOTE2 for the frequency F4 of the first mote MOTE1. After the emission of the second signal pulse at T=1, the double arrow indicated with reference number 515 shows that the time delay measured by the first mote MOTE1 for the frequency F2 of the second mote MOTE2 is substantially identical to the time delay (time delay is 1.5 millisecond) measured by the second mote MOTE2 for the frequency F4 of the first mote MOTE1. This allows for identifying that the first mote MOTE1 and the second mote MOTE2 are neighboring motes of which the distance between two subsequent signal pulses has been reduced.

The same occurs for the arrows indicated with reference numbers 520 and 525 which indicate that the time delay measured by the first mote MOTE1 for the frequency F7 of the third mote MOTE3 is substantially identical to the time delay (time delay is 4.5 millisecond) measured by the third mote MOTE3 for the frequency F4 of the first mote MOTE1. This again allows for identifying that the first mote MOTE1 and the third mote MOTE3 are neighboring motes of which the distance between two subsequent signal pulses has been reduced. And again the arrows indicated with reference numbers 530 and 535 indicate that the time delay measured by the second mote MOTE2 for the frequency F7 of the third mote MOTE3 is substantially identical to the time delay (time delay is 5 millisecond) measured by the third mote MOTE3 for the frequency F4 of the second mote MOTE2. This again allows for identifying that the second mote MOTE2 and the third mote MOTE3 are neighboring motes of which the distance between two subsequent signal pulses has been reduced. This data allows for a mapping of the relative position of the three motes in the system. Similar relationships may be found for other neighboring motes in the system such that the overall mapping of the motes relative to each other may be done and even may be shown to change over time. This allows for a mapping of a spatial configuration of an environment without any external reference.

Summarizing, the invention provides a first mote and a system of motes, which is capable to relatively locate itself, and, thus, is capable to detect a spatially configuration without the need for an external reference. A first mote 210, 220, 230, 240 is configured for wirelessly receiving a plurality of signal pulses transmitted by a plurality of second motes 210, 220, 230, 240, 300, each second mote transmitting the signal pulse at one particular modulation frequency F1, F2, . . . Fn from a plurality of frequencies within a predefined frequency band F1-Fn. The first mote includes a receiver for determining from a received signal at least one of the plurality of signal pulses. The receiver is further configured to identify the particular modulation frequency of the at least one signal pulse. The first mote further includes a clock for generating a time-stamp at which the signal pulse is received and a storage unit for storing the time-stamp together with the corresponding identified particular modulation frequency. The system includes a plurality of first motes and second motes. The first motes and second motes may both transmit and receive signal pulses.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verbs "comprise" and "include" and their conjugations do not exclude the presence of elements or steps other than those stated in a claim. The article "a" or "an" preceding an element does not exclude the presence of a plurality of such elements. The invention may be implemented by means of hardware including several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A first mote for wirelessly receiving a plurality of signal pulses transmitted by a plurality of second motes, each second mote transmitting the signal pulse being a carrier wave modulated with an envelope function at one particular modulation frequency from a plurality of frequencies within a predefined frequency band, the plurality of second motes using a plurality of different modulation frequencies, the first mote comprising:
a receiver configured and constructed for receiving signals within the predefined frequency band and for determining from the received signals at least one of the plurality of signal pulses, the receiver being further configured and constructed to identify the particular modulation frequency of the at least one signal pulse,
a clock for generating a time-stamp at which the signal pulse is received by the first mote, and
a storage unit for storing the time-stamp together with the corresponding identified particular modulation frequency.

2. The first mote according to claim 1, wherein the predefined frequency band is divided in a plurality of non-overlapping frequency sub-bands , the receiver being configured and constructed to identify the particular modulation frequency of the at least one signal pulse in any of the plurality of non-overlapping frequency sub-bands.

3. The first mote according to claim 2, wherein the first mote is configured and constructed for transmitting a sequence of first signal pulses, each first signal pulse being transmitted at the first particular modulation frequency at predetermined time intervals between the subsequent first signal pulses.

4. The first mote according to claim 1, wherein the first mote further comprises a transmitter for transmitting a first signal pulse, the first mote being configured and constructed for transmitting the first signal pulse being a carrier wave modulated with an envelope function at a first particular modulation frequency being one of the plurality of frequencies within the predefined frequency band.

5. The first mote according to claim 4, wherein the transmitter by design is configured and constructed to only transmit signal pulses at the first particular modulation frequency together with a further time-stamp at which the first signal pulse is transmitted.

6. The first mote according to claim 4, wherein the first mote is configured and constructed to synchronize the clock upon receiving of a synchronization signal.

7. The first mote according to claim 1, wherein the first mote comprises means for extracting data from the storage unit.

8. The first mote according to claim 1, wherein the predefined frequency band comprises ultrasound and/or electromagnetic radiation.

9. The first mote according to claim 1, wherein the first mote is configured and constructed to be buoyant in a predefined fluid.

10. The first mote according to claim 1, wherein at least some of the signal pulses comprise data representing additional information measured by at least some of the first motes and the second motes.

11. The first mote according to claim 1, wherein
each particular modulation frequency identifies a subset of the plurality of second motes, or
each particular modulation frequency identifies an individual mote of the plurality of second motes.

12. A system, comprising:
a plurality of first motes according to claim 1; and
a plurality of second motes configured for transmitting the signal pulse, each second mote transmitting the signal pulse at one particular modulation frequency within a predefined frequency band.

13. The system according to claim 12, wherein the clock of each of the plurality of first motes is synchronized.

14. The system according to claim 12, wherein the second motes are identical to the first motes.

15. The system according to claim 12, wherein the first motes and the second motes in the system are configured for storing the time-stamp together with the corresponding identified particular modulation frequency during a predetermined time for detecting a spatial configuration of an environment.

16. The system according to claim 15, wherein the system is configured for detecting the spatial configuration of the environment without a reference outside the system.

* * * * *